United States Patent [19]

Kuroyanagi et al.

[11] 4,137,501
[45] Jan. 30, 1979

[54] NOISE SUPPRESSION DEVICE

[75] Inventors: Yoshitaka Kuroyanagi; Tatsuo Teratani, both of Toyota, Japan

[73] Assignee: Toyota Jidosha Kogyo Kabushiki Kaisha, Aichi, Japan

[21] Appl. No.: 719,930

[22] Filed: Sep. 2, 1976

[30] Foreign Application Priority Data

Apr. 7, 1976 [JP] Japan .................................. 51-39760

[51] Int. Cl.² ............................................. H04B 1/18
[52] U.S. Cl. .................................... 325/313; 325/377; 343/711
[58] Field of Search ..................... 343/180, 711, 712; 325/311, 312, 65, 377, 379, 380, 386, 473

[56] References Cited

U.S. PATENT DOCUMENTS

| 2,196,272 | 4/1940 | Peterson | 333/70 |
| 2,640,916 | 6/1953 | Espley | 343/180 X |
| 3,484,584 | 12/1969 | Shaw, Jr. | 343/711 |
| 4,056,782 | 11/1977 | Makino et al. | 325/313 |

FOREIGN PATENT DOCUMENTS

| 486240 | 10/1929 | Fed. Rep. of Germany | 343/175 |
| 887959 | 8/1953 | Fed. Rep. of Germany | 343/180 |

OTHER PUBLICATIONS

Meinke-Gunlach, Hochfrequeatechnik, 3 Auf. 1968, PP. 480 & 481.

Primary Examiner—Benedict V. Safourek
Attorney, Agent, or Firm—Koda and Androlia

[57] ABSTRACT

A noise suppression device for noisy transmission wires in a motor vehicle including a first low impedance element connected to an arbitrarily chosen point on the noisy wire and a second low impedance element connected at the nodal point of the standing wave of the noise current on the noisy wire.

5 Claims, 4 Drawing Figures

NOISE SUPPRESSION DEVICE

BACKGROUND OF THE INVENTION

1. Field of Invention

This invention relates to noise suppression devices and more particularly to noise suppression devices utilized in motor vehicles.

2. Description of the Prior Art

In recent years automobiles have been equipped with various kinds of electronic systems such as FM radios, radiotransmitters, electrically controlled fuel injection devices, etc. Since the systems operate with signals in the high frequency range, they are vulnerable to adverse effects caused by high frequency noise currents steming from the ignition system, voltage regulator, and various other kinds of manual and automatic switches (horn relays, turn signals, etc.). These harmful effects, are, for instance, noise in the radio signal, malfunction or loss of function of the system, etc. Accordingly, it has become frequently necessary to provide some remedy to eliminate these harmful effects.

In the prior art, it has become practice to suppress the noise by preventing noise generation itself by means of an anti-noise device such as a capacitor that bypasses high frequency noise currents at their sources or by avoiding any coupling of a wire that passes noise currents with another wire that is coupled to an electronic device which would be vulnerable to noise effects. The latter of noise prevention methods is effective when a high frequency noise current is being coupled from one wire to another. In this case the noise prevention is achieved by either increasing the distance between the two wires or by reducing this coupling, using, for example, a shielded wire. Previously used methods, however, have not proven fully effective and are also associated with drawbacks such as increased vehicle cost due to installation of additional special equipment and increased space requirements for the special equipment and redesign of the electrical wiring harness, etc..

SUMMARY OF THE INVENTION

Accordingly, it is a general object of the present invention to provide a noise suppression device for the wires in motor vehicles in which high frequency noise currents are present which suppresses the noise to an extremely low level.

It is another object of the present invention to provide a noise suppression device which does not consist of any special equipment.

It is yet another object of the present invention to provide a noise suppression device for motor vehicles which does not require any extra space in the automobile body.

It is still another object of the present invention to provide a noise suppression device for motor vehicles which is low in cost.

In keeping with the principle or principal concept of the present invention, the objects are accomplished with a unique noise suppression device comprising a first low impedance element connected to an arbitarily chosen point on a noisy wire in the motor vehicle thereby partially reducing the noise on the noisy wire and creating a standing wave on the noisy wire. A second low impedance element is then connected at a nodal point of the standing wave of the noise current on the noisy wire thereby substantially reducing the noise current on the noisy wire. In practice the low impendance element may consist of a length of wire with an open at one end and electrically coupled to the noisy wire at the other. Furthermore, the length of wire should have a length equal to approximately odd multiples of the wave length of the noise current divided by four.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
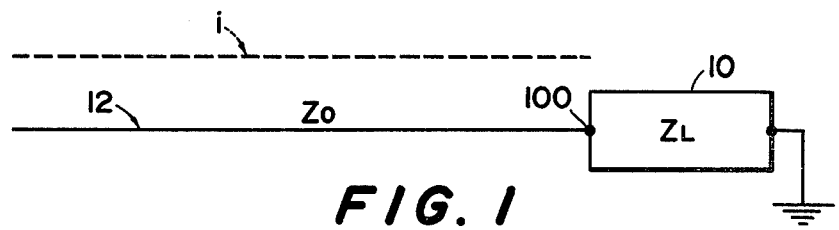
FIG. 1 is an example of a noisy wire before the present invention is applied.

Referring to FIG. 1, shown therein is the state of a noise current on a noisy wire such as a connecting wire to a defroster heater wire. The defroster heating element 10 is installed on the rear windshield of the vehicle and its connecting wire 12 extends to the battery via a switch located near the drivers seat of the vehicle. Therefore, the connecting wire 12 is apt to pick up noise from the ignition system, voltage regulator, etc. and is liable to become very noisy. Since this wire 12 extends from the front section of the vehicle all the way to the rear section of the vehicle through a long distance, it tends to be electromagnetically coupled with other wires. It is well known that if the radio antenna is placed near the rear window, the noise current will be electromagnetically coupled to the antenna and generate noise in the radio.

As shown in FIG. 1 the intensity of the noise current i of the noisy wire 12 is substantially uniform over its entire length. This is the case where the impedance matching between the noisy wire 12 and the defroster heating wire 10 is favorable; i.e., the value of the characteristic impedance $Z_L$ of the defroster heaing wire 10 at its input is approximately equal to the value of the characteristic impedance $Z_O$ of the noisy wire 12. Furthermore, the noise current along the noisy wire 12 does not form a standing wave pattern in this case. Instead the current density is nearly constant as shown in FIG. 1.

Figure 2:
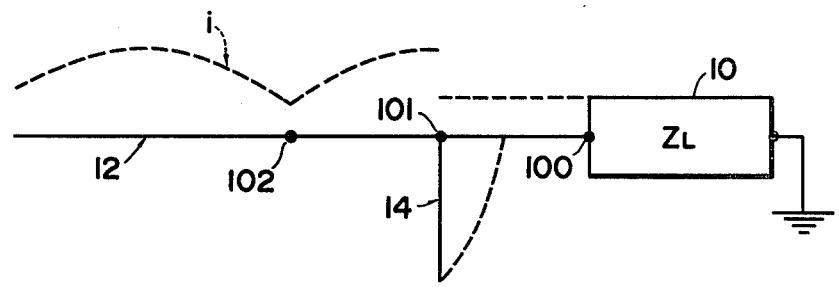
FIG. 2 is a circuit diagram of a noisy wire with one low impendance element connected thereto.

Referring to FIG. 2, the first noise current suppression wire 14 is connected at an arbitrary location to the noisy wire 12 to form the first low impedance branch path as shown in FIG. 2. The first noise suppression wire 14 may be a simple single conductor wire with an open at one end placed adjacent a conducting surface or the like of the vehicle body. It is desirable to set the length of the suppression wire 14 at $(\lambda/4) + (\lambda/2) \times n$ ($n = 0, 1, 2, \ldots$) where $\lambda$ is the wave length of the high frequency noise current that transmits on the wire. For the case shown in FIG. 2, the distribution of the noise current i and the noisy wire 12 changes into the form shown by the broken line. The input impedance of the first noise suppression wire 14 is at an extremely low value of only a few ohms as seen from point 101 where the noise suppression wire 14 is connected, whereas the input impedance of the defrostive wire 10 seen from the same point is its characteristic impedance $Z_L$ which is a relatively high value, like a few hundred ohms. Consequently, a substantial portion of the high frequency noise current flows into first noise suppression wire 14. The noise current distribution in the noisy wire 12 is therefore determined by the placement of the first noise suppression wire 14. Since the impedance of wire 14 is lower than that of wire 12, an impedance mismatch occurs between wire 14 and the noisy wire 12. Accordingly, as a result, a standing wave having a set pattern is formed on noisy wire 12 as shown in FIG. 2.

Since the initial intensity of distribution of the noise current is approximately uniform with the noisy wire 12, the first noise suppression wire 14 can be connected at any arbitrarily selected point, such as an empty space in the vehicle body.

It is clear from the preceding explanation that the standing wave pattern is established over noisy wire 12 by the coupling of the first noise suppression wire 14 to the noisy wire 12. Although, with this measure a certain decrease in the noise current in the noisy wire 12 is recognized, it is still at a level that will cause a serious detrimental effect. To suppress the noise even further, a second noise suppression wire 16 that forms a second low impedance branch is coupled to noisy wire 12 as shown in FIG. 3.

Figure 3:
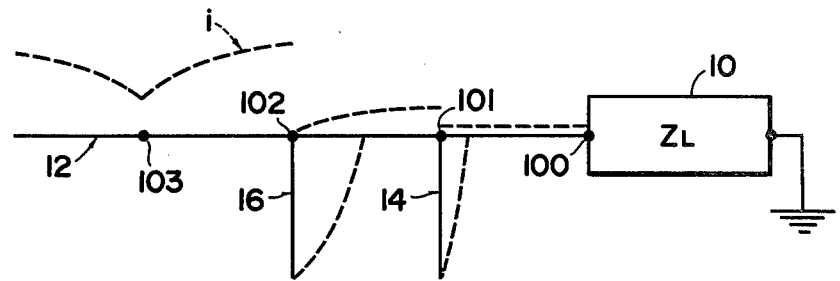
FIG. 3 is a circuit diagram of a noise suppression device in accordance with the teachings of the present invention.

In FIG. 3, the second noise suppression wire 16 of a length $(\lambda/4) + (\lambda/2) \times n$ ($n = 0, 1, 2, \ldots$) with an open end is coupled at point 102 which has become a node of the standing wave pattern on noisy wire 12. Since the impedance of noisy wire 12 at the junction point 101, as seen from junction point 102, is very high at the frequency of the noise current and since the impedance of the second suppression wire 16 is extremely low, substantially all of the high frequency noise current i carried by noisy wire 12 flows into noise suppression wire 16 and almost no noise current preceeds towards junction point 101. This phenomenon is not limited to exactly the frequency of the noise current as set by the length of the noise suppression wires 14 and 16, but also applies to the frequency range in the vicinity of the frequency of the noise current and accordingly enables the noise suppression in that frequency range. Incidentially, when the second noise suppression wire 16 is connected at junction point 102, the location of the node of the standing wave shifts to point 103.

By locating the second noise suppression 16 as disclosed above, the transmission of the noise current into defroster heating wire 10 is greatly suppressed and accordingly the capture of noise by antenna for the radio is prevented.

Figure 5:
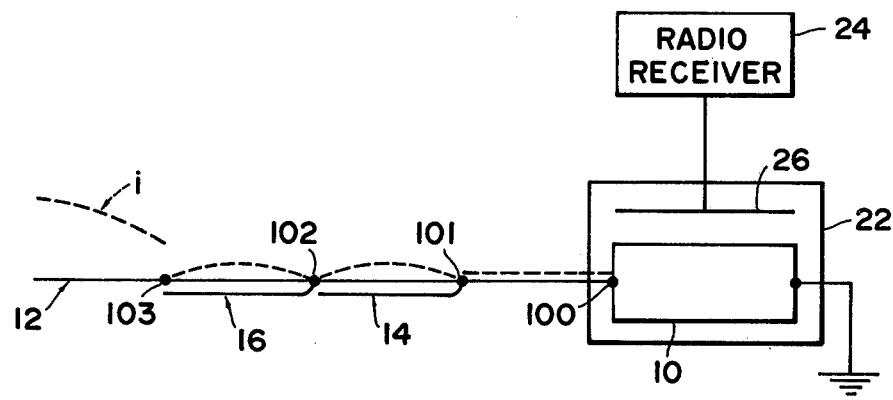

In practice, the lengths of the first and second noise suppression 14 and 16 in FIG. 3, are set at $(\lambda/4)$. $(\lambda/4)$ is approximately equal to 70 centimeters for a frequency of the FM radio (85 MHz). To install the two noise suppression wires 14 and 16 on the vehicle, the noise suppression wires 14 and 16 are taped to the noisy wire 12 with plastic tape. Such a structure has the merit that the wire harness can be easily attached to various parts of the vehicle body and it is also possible to further enhance the effectiveness of the noise suppression as a whole due to phase cancellations of high frequency currents in those sections where noise suppression wires 14 and 16 are parallel to the noisy wire 12. Moreover, it is possible to increase the noise suppression even more by increasing the number of second noise suppression wires 16. FIG. 5 shows an embodiment wherein the noise suppression wires 14 and 16 are provided in parallel with the noisy wire 12. Provided in a rear window 22 is a defogger heating wire 10, one end of which is connected to a battery (not shown) via a wire 12, and the other end of which is earthed. The noise suppression wires 14 and 16 are connected onto said wire 12. These wires 14 and 16 are adhesively attached to the wire 12 with plastic tape, or may be formed of electrically conductive materials coated on the insulating shield of the wire 12. Disposed in a rear window 22 is a radio antenna 26 connected to a radio receiver, i.e., FM radio receiver.

The embodiment disclosed herein has been described in relation to the noise contamination of an FM radio due to the defroster heating wire 10. However, the same will apply to noise problems due to high frequency noise currents on other wires. Furthermore, it is also possible to substitute other types of low impedance elements such as a capacitor for the noise suppression wires 14 and 16 and to connect the second low impendance element between a node of the standing wave and the vehicle body.

Figure 4:
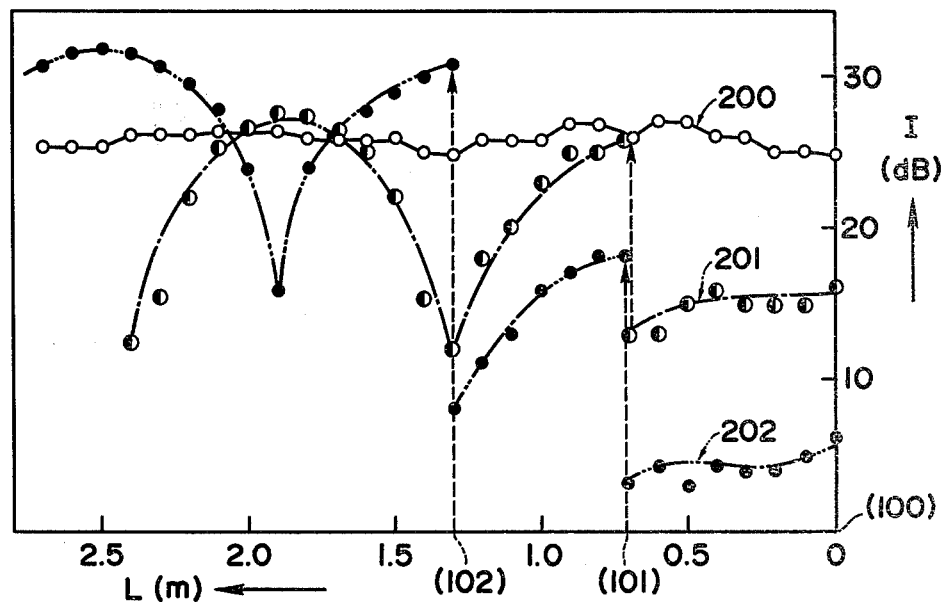
FIG. 4 shows the characteristics of the invention in suppressing noise currents in the frequency range of an FM radio.

FIG. 4 shows experimental results that demonstrate the effectiveness of the invention as a means of noise suppression in the frequency range of an FM radio. The abscissa in FIG. 4 is the distance (L) measured from the input end 100 of the defroster heating wire 10 along the noisy wire 12 in a direction away from the heating wire 10. The ordinante is the intensity (I) of the noise current. The initial noise current 200, as shown in FIG. 4, is suppressed by about 10 db, line 201, by connecting the first noise suppression wire 14 to the junction point 101. The noise current is further suppressed another 10 ab as shown by line 202 when a second noise suppression wire 16 is coupled to the nodal point 102 of the standing wave pattern thus formed. Therefore, it has been confirmed that a noise suppression of approximately 20 db from the initial state can be achieved.

According to the preceeding explanation, it has been shown that it is possible to reduce the intensity of the noise current to such a low level that it has no effect upon other wires. Furthermore, since the invention allows a free choice for the location of the first noise suppression wire 14 and then fixes the second noise suppression wire 16 at a specific position relative to the first wire, it is possible to choose an optimum location for the first and second noise suppression wires 14 and 16 in the generally limited available space of a vehicle. Moreover, the invention has the following merits:

1. It effectively suppresses noise without effecting the primary function of the wire;

2. The structure is simple and inexpensive and resists damage due to vibration or impact;

3. The frequency range in which it provides noise suppression can be readily changed by properly adjusting the length and location of the attachment of the noise suppression wires; and 4. It is inexpensive.

In all cases it is understood that the above described embodiment is merely illustrative of one of the many possible specific embodiments which represent the applications of the principle of the present invention. Furthermore, numerous and varied other arrangements can be readily devised in accordance with the principle of the present invention by those skilled in the art without departing from the spirit and scope of the invention.

We claim:

1. A noise suppression device for suppressing noise currents in an electrical circuit in motor vehicles comprising:
   a first wire electrically coupled to an arbitrarily chosen point on said circuit thereby creating a standing wave pattern of noise current on said circuit; and
   a second wire electrically coupled to a node of said standing wave pattern thereby substantially reducing the magnitude of the noise current, each of said first and second wires having an open end and a length equal to $\lambda/4 + \lambda/2 \times n$ ($n = 0, 1, 2, \ldots$), where is the wave length of the noise current to be suppressed, said first and second wires are disposed along and substantially in parallel to said circuit on the side where high frequency currents occur.

2. A noise suppression device for an electrical circuit carrying noise currents in a motor vehicle, comprising:
   a defogger circuit having a defogger heating wire connected to a power source through a switch, said heating wire being disposed in a rear window of the vehicle;
   an antenna connected to a FM-radio, and disposed in the rear window of the vehicle along with said heating wire;
   a first wire electrically coupled to an arbitrarily chosen point on said circuit thereby creating a standing wave pattern of noise currents on said circuit; and
   a second wire electrically coupled to a node of said standing wave pattern thereby preventing the noise currents from entering interferingly into the antenna through the heating wire, each of said first and second wires having an open end and a length equal to $\lambda/4 + \lambda 2 \times n$ ($n = 0, 1, 2, \ldots$), where $\lambda$ is the wavelength of the noise current to be suppressed.

3. A noise suppression device for electrical circuit carrying noise currents in a motor vehicle according to claim 2, wherein said first and second wires each having a length of approximately 60 cm.

4. A noise suppression device according to claim 2, wherein said first and second wires are arranged along said circuit toward the side form which said power source is connected.

5. A noise suppression device for suppressing noise currents in an electrical circuit in a motor vehicle wherein the electrical circuit includes a load having a characteristic impedance and wire coupled to said load having a characteristic impedance substantially the same as said load, said device comprising:
   a first wire electrically coupled to an arbitrarily chosen point on said wire thereby creating a standing wave pattern of noise current on said wire; and
   a second wire electrically coupled to a node of said standing wave pattern thereby substantially reducing the magnitude of said noise current, each of said first and second wires having an open end and a length equal to $\lambda/4 + \lambda/2 \times n$ ($n = 0, 1, 2, \ldots$), where $\lambda$ is the wave length of the noise current to be suppressed.

* * * * *